United States Patent
Chen et al.

(10) Patent No.: US 9,591,708 B2
(45) Date of Patent: Mar. 7, 2017

(54) LED DRIVING DEVICE FOR DYNAMIC SEGMENT CONFIGURATIONS AND THE LED LIGHTING APPARATUS THEREOF

(71) Applicant: SHENZHEN SENDIS SEMICONDUCTOR CO.,LTD, Shenzhen (CN)

(72) Inventors: Xiaoyu Chen, Shenzhen Guandong (CN); Bo Chen, Guandong (CN); Xunsheng Deng, Guandong (CN); Yanquan Mai, Guandong (CN)

( * ) Notice: Subject to any disclaimer, the term of this patent is extended or adjusted under 35 U.S.C. 154(b) by 0 days.

(21) Appl. No.: 14/895,999

(22) PCT Filed: Jul. 1, 2014

(86) PCT No.: PCT/CN2014/081411
§ 371 (c)(1),
(2) Date: Dec. 4, 2015

(87) PCT Pub. No.: WO2015/014192
PCT Pub. Date: Feb. 5, 2015

(65) Prior Publication Data
US 2016/0135261 A1 May 12, 2016

(30) Foreign Application Priority Data
Jul. 31, 2013 (CN) .......................... 2013 1 0327523

(51) Int. Cl.
*H05B 33/08* (2006.01)

(52) U.S. Cl.
CPC ....... *H05B 33/0827* (2013.01); *H05B 33/083* (2013.01); *H05B 33/0809* (2013.01); *H05B 33/0824* (2013.01); *Y02B 20/348* (2013.01)

(58) Field of Classification Search
USPC ... 315/200 R, 88, 89, 90, 93, 119, 121, 122, 315/123, 127, 128, 185 R, 186, 192, 193, 315/201, 205, 209 R, 210, 216, 217, 225, 315/226, 224, 291, 294, 295, 297, 299, 315/306, 307, 312, 313, 352, 362
See application file for complete search history.

(56) References Cited

U.S. PATENT DOCUMENTS

2010/0308739 A1* 12/2010 Shteynberg .......... H05B 33/083
315/193

* cited by examiner

*Primary Examiner* — Douglas W Owens
*Assistant Examiner* — Jianzi Chen
(74) *Attorney, Agent, or Firm* — James M. Smedley LLC; James Michael Smedley, Esq.

(57) ABSTRACT

The invention discloses an LED driving device for dynamic segment configurations and the LED lighting apparatus thereof, wherein, the said LED driving device includes a first adjustable LED lamp string unit, a first N-type switch module, at least one second adjustable LED lamp string unit, one unidirectional conduction unit, one P-type switch module, one second N-type switch module, control logic module and current detection module; the control logic module outputs control signals, based on output voltage changes from the bridge rectifier, to control the on and off states of the first adjustable LED lamp string unit, the adjustable LED lamp string module, the P-type switch module, the first and second N-type switch module, also it adjusts the parallel and serial connection states of the first and second adjustable LED lamp string units dynamically. The invention adopts the dynamically configuring technology, improving the lighting effects and the utilization of LED lamps.

8 Claims, 7 Drawing Sheets

LED DRIVING DEVICE FOR DYNAMIC SEGMENT CONFIGURATIONS AND THE LED LIGHTING APPARATUS THEREOF

CROSS-REFERENCES TO RELATED APPLICATIONS

This application is a continuation application of PCT Patent Application PCT/CN2014/081 411, filed on Jul. 1, 2014, which claims priority to Chinese Patent Application No. 20131 0327523.2, filed on Jul. 31, 2013, the content of all of which is incorporate herein by reference.

FIELD OF THE INVENTION

The present invention relates to the field of LED lighting technology area, and more particularly, to an LED driving device for dynamic segment configurations and the LED lighting apparatus thereof.

BACKGROUND

In a traditional driving circuit for LED (Light Emitting Diode), after the supplied power has passed through a bridge rectifier and has been converted into a DC power, generally, it still requires extra processes through some electric elements including inductors and electrolytic capacitors, before driving any LEDs. However, the life of an electrolytic capacitor is relatively short, which has severely restricted the whole life of a driving circuit for LED, also, the conversion efficiency is usually as low as 80%. Thus, it has seriously affected the LED lighting effects.

Figure 1:
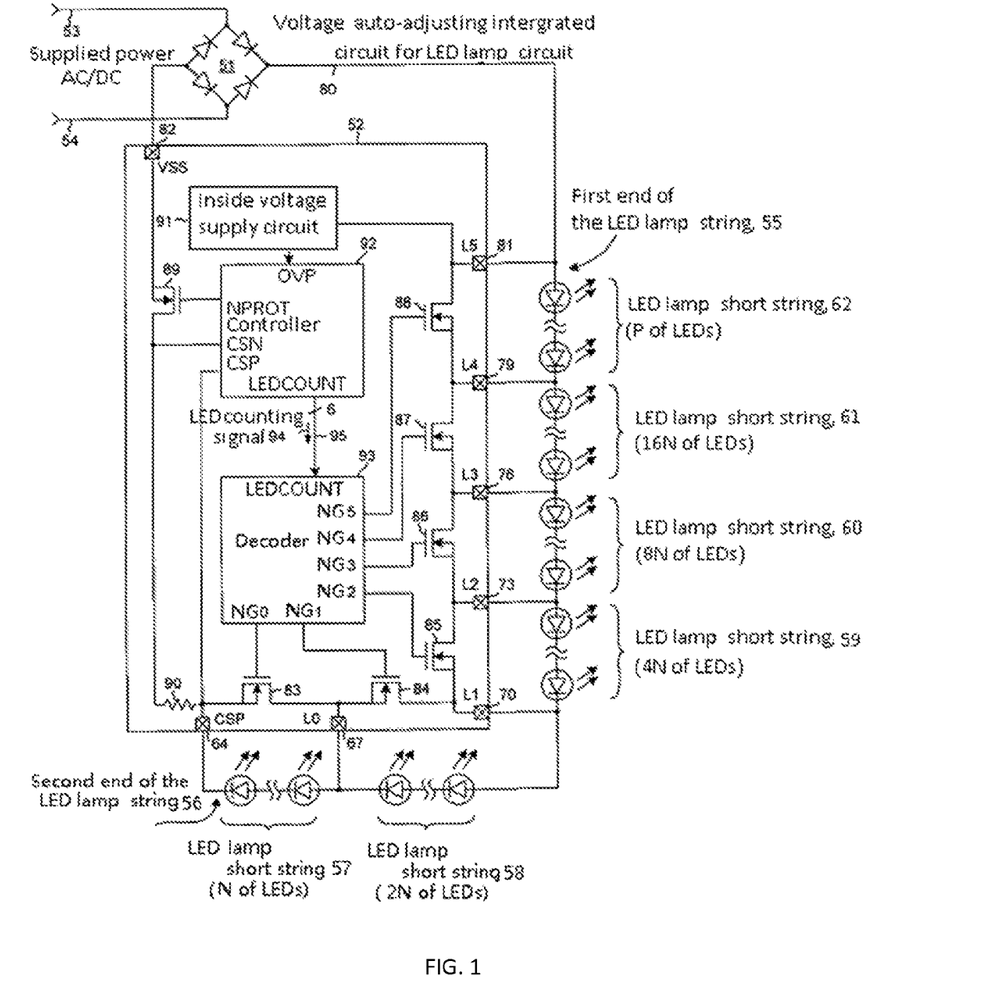
FIG. 1 illustrates a circuit diagram in the patent of invention with a publication No. CN102196627.
Figure 2:
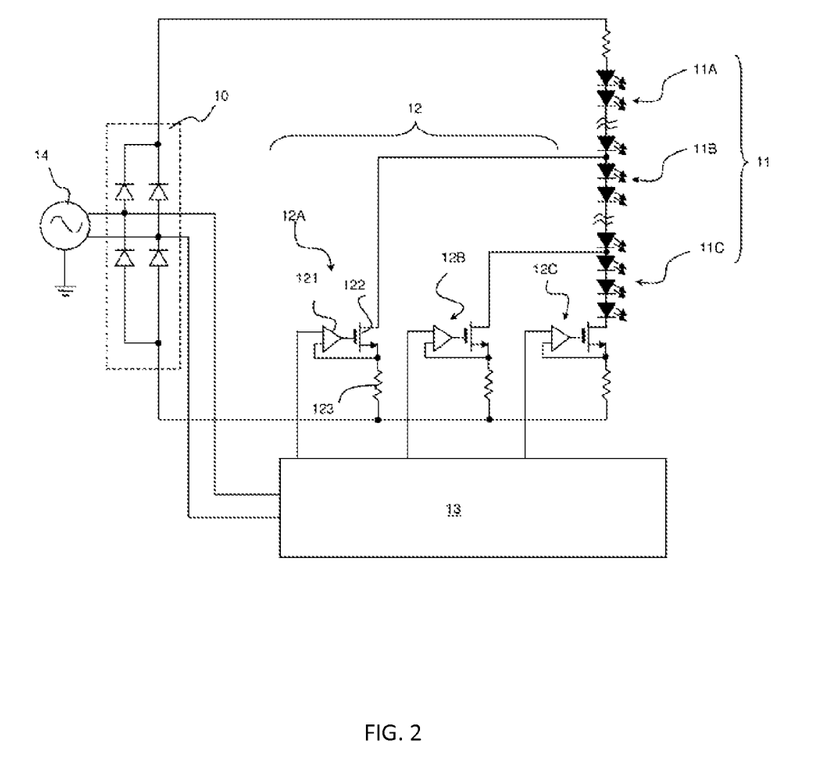
FIG. 2 illustrates a circuit diagram in the patent of invention with a publication No. US 2011/0084619A1.

In order to avoid the use of inductors and capacitors, designers have made some improvements on the driving circuit for LED, shown as FIG. 1, which is a circuit diagram in the patent of invention with a publication No. CN 102196627, wherein, three MOS transistors, 88, 87, 86, are applied to short-circuit or open-circuit the LED short string 62, LED short string 61, or LED short string 60. Take the MOS transistor 87 as an example, when it short-circuits the LED short string 61, the power voltage between L3 and L4 is close to zero; when it open-circuits the LED short string 61, the power voltage between L3 and L4 is 16N×3.0V (wherein, 3.0V is the power voltage between the two ends of a single LED, when it is on). Suppose the supplied power voltage is 220V, then, when all LEDs are lit-on, the voltage drop over the LEDs should be close to the highest voltage output from the bridge rectifier, which is, 220×1.414=311V, thus, the total number of LEDs should be around 100, and N should be at least 2. Therefore, when the MOS transistor 87 open-circuits the LED short string 61, the power voltage between L3 and L4 is 16N×3.0V>16×2×3.0V=96V. If all LEDs are lit-on, the power voltage of L3 to the ground should be 15×3.0V=45.0V From the analysis above, it can be seen that, the lowest withstand voltage from the source of the MOS transistor 87 (connecting to L3) to the ground is 45V, the lowest withstand voltage from the drain of the MOS transistor 87 (connecting to L4) to the ground is 45+96=141V, while the lowest withstand voltage between the drain and the source of a standard MOS transistor 87 is 96V. Also, the driving circuit for the gate of the MOS transistor 87 (connecting to NG4) is also very complicated. In current arts for semi-conductor integrations, such a MOS transistor is impossible to be integrated. Therefore, the circuit configuration of the driving circuit is particularly complex, the requirements of the withstand voltages for each element are relatively high, and it is difficult to be integrated into one chip, therefore, it does not satisfy the increasing miniaturization requirements for electronic products. Shown as FIG. 2, which is a circuit diagram in the patent of invention with a publication No. US 2011/0084619A1, wherein, according to the claim 2, it can be seen that, through an AC (alternating current) synchronous circuit, different LED light strings are selected to be turned on at different time points, and the currents in the LED lamp strings are adjusted according to time. When driving LEDs, shutting 12B off and 12C on at a certain time point, the number of LEDs gets increased, and the current passing through those LEDs also gets increased. However, at the instant time point of turning off 12B, the voltage over the drain 122 in 12A will be very high, which is around the total number of LED lamps in both light-strings 11A and 11B times 3.0V, and, usually, the current in LEDs is 30 mA or higher. Suppose the total number of lamps in both 11A and 11B is 30, then, the power consumption of the chip will be 30×3.0V×30 mA=2700 mW, which means, the efficiency of a commonly used 7 W LED lighting system is less than 80%. Also, since the power consumption in the chip is 2.7 W, it will require a higher requirement for chip packaging.

And the light flux of an LED driven by a conventional AC driving apparatus will get higher following the rising of the supplied power voltages, which means a relatively large variation in light flux, also, in a conventional AC driving mode for LED, when the voltage is low, only a part of the LEDs in the LED string will get lit-on, and when the voltage is high, all LEDs will get lit-on, thus, during a sinusoidal voltage cycle, part of the LEDs are almost always in an off status, while other part of LEDs get lit-on during only ¼ cycle or even less, therefore, the attenuations of all LEDs are different, resulting in a worse lighting effects after a long time.

Therefore, the prior art needs to be improved and developed.

BRIEF SUMMARY OF THE DISCLOSURE

The technical problems to be solved in the present invention is, aiming at the defects of the prior art, providing an LED driving device for dynamic segment configurations and the LED lighting apparatus thereof, in order to solve the problems in the prior art, including a low conversion efficiency and a bad lighting effect caused by an inconsistent attenuation of LED lamps.

The technical solution of the present invention to solve the technical problems is as follows:

An LED driving device for dynamic segment configurations, connecting to a bridge rectifier, which includes: a first adjustable LED lamp string unit, a first N-type switch module, at least one adjustable LED lamp string module, at least one P-type switch module, at least one second N-type switch module, a control logic module, applied to control the first adjustable LED lamp string unit, the adjustable LED lamp string module, the P-type switch module, the first N-type switch module and the second N-type switch module, as well as a current detection module, applied to detect the output currents from the first and the second N-type switch modules before feeding back to the control logic module; the adjustable LED lamp string module comprises a second adjustable LED lamp string unit and a unidirectional conduction unit;

The control logic module outputs control signals, based on the output voltage variations from the bridge rectifier, to control the turn-on and turn-off states of the first adjustable LED lamp string unit, the adjustable LED lamp string module, the P-type switch module, the first N-type switch module and the second N-type switch module, also it adjusts the serial connection and parallel connection states of the first and the second adjustable LED lamp string units dynamically.

The LED driving device for dynamic segment configurations, wherein, the P terminal of the second adjustable LED lamp string unit connects to the positive output terminal of the bridge rectifier, as well as connecting to the negative terminal of the unidirectional conduction unit and the P terminal of the first adjustable LED lamp string unit through the P-type switch module, the N terminal of the second adjustable LED lamp string unit connects to positive terminal of the unidirectional conduction unit, the N terminal of the second adjustable LED lamp string unit connects to the current detection module through the second N-type switch module, the N terminal of the first adjustable LED lamp string unit connects to the current detection module through the first N-type switch module.

The LED driving device for dynamic segment configurations, wherein, the second adjustable LED lamp string unit includes a first LED lamp string, a second LED lamp string and a first P-type switch unit; the first LED lamp string connects to the second LED lamp string in series, one end of the first P-type switch unit connects to the positive terminal of the first LED lamp string, the other end of the first P-type switch unit connects to the negative terminal of the first LED lamp string and the positive terminal of the second LED lamp string, the control terminal of the first P-type switch unit connects to the control logic module, the positive terminal of the first LED lamp string connects to the positive output terminal of the bridge rectifier, the negative terminal of the second LED lamp string connects to the positive terminal of the unidirectional conduction unit.

The LED driving device for dynamic segment configurations, wherein, the second adjustable LED lamp string unit includes a first LED lamp string, a second LED lamp string, a third LED lamp string, a first P-type switch unit and a second P-type switch unit; the first LED lamp string, the second LED lamp string and the third LED lamp string are connected in series, one end of the first P-type switch unit connects to the positive terminal of the first LED lamp string, the other end of the first P-type switch unit connects to the negative terminal of the first LED lamp string and the positive terminal of the second LED lamp string, the control terminal of the first P-type switch unit connects to the control logic module; one end of the second P-type switch unit connects to the positive terminal of the second LED lamp string, the other end of the second P-type switch unit connects to the negative terminal of the second LED lamp string and the positive terminal of the third LED lamp string, the control terminal of the second P-type switch unit connects to the control logic module, the positive terminal of the first LED lamp string connects to the positive output terminal of the bridge rectifier, the negative terminal of the third LED lamp string connects to the positive terminal of the unidirectional conduction unit.

The LED driving device for dynamic segment configurations, wherein, the unidirectional conduction unit includes a diode, whose anode connects to the N terminal of the second adjustable LED lamp string unit, while the cathode of the diode connects to the P terminal of the first adjustable LED lamp string unit.

The LED driving device for dynamic segment configurations, wherein, the first N-type switch module includes a second MOS transistor, the gate of the second MOS transistor connects to the control logic module, the drain of the second MOS transistor connects to the N terminal of the first adjustable LED lamp string unit, and the source of the second MOS transistor gets grounded through the current detection module;

The second N-type switch module includes a third MOS transistor, the gate of the third MOS transistor connects to the control logic module, the drain of the third MOS transistor connects to the N terminal of the second adjustable LED lamp string unit, and the source of the third MOS transistor gets grounded through a current detection module;

The LED driving device for dynamic segment configurations, wherein, the P-type switch module includes a controllable current source, JFET, a first resistor, a Zener diode and a first MOS transistor; the controllable current source connects to the control logic module, one end of the controllable current source connects to the source of the JFET, while the other end gets grounded; the drain of the JFET connects to the gate of the first MOS transistor, and connects to the source of the first MOS transistor through a first resistor, the gate of the JFET gets grounded; the anode of the Zener diode connects to the gate of the first MOS transistor, the cathode of the Zener diode connects to the source of the first MOS transistor; the drain of the first MOS transistor connects to the adjustable LED lamp string module and the first adjustable LED lamp string unit, the source of the first MOS transistor connects to the positive output terminal of the bridge rectifier.

The LED driving device for dynamic segment configurations, wherein, the number of each of the adjustable LED lamp string module, P-type switch module and the second N-type switch module is K, wherein, K is a positive integer;

The control logic module outputs control signals based on the variations of the output voltages from the bridge rectifier, and controls the turn-on and turn-off states of the first adjustable LED lamp string unit, K of the adjustable LED lamp string modules, K of the P-type switch modules, a first N-type switch module and K of the second N-type switch modules, adjusts the parallel and serial connection states dynamically, of the first adjustable LED lamp string unit and K of the second adjustable LED lamp string units, achieves one group of adjustable LED lamp string units in a number of N connecting in series, before connecting different groups in parallel; wherein, N is a positive integer from 1 to K+1.

An LED lighting apparatus, wherein, it includes: a bridge rectifier applied to rectify the input signals and an LED driving device for dynamic segment configurations, the positive terminal of the bridge rectifier connects to the LED driving device for dynamic segment configurations, while the negative terminal gets grounded.

Comparing to the prior arts, the present invention provides an LED driving device for dynamic segment configurations and the LED lighting apparatus thereof, wherein, the control logic module outputs control signals, based on the output voltage variations from the bridge rectifier, to control the turn-on and turn-off states of the first adjustable LED lamp string unit, the adjustable LED lamp string module, P-type switch module, the first N-type switch module and the second N-type switch module, adjusts the parallel and serial connection states dynamically, of the first adjustable LED lamp string unit and the adjustable LED lamp string modules. The present invention adopts a dynamic configuration technology, making as many as LEDs light up, also, it makes all LEDs' lit-on time the same, thus improves the lighting effects and utilization rates.

DETAILED DESCRIPTION

The present invention provides an LED driving device for dynamic segment configurations and the LED lighting apparatus thereof, in order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

The LED driving device for dynamic segment configurations, provided by the present invention, connects to the positive output terminal of the bridge rectifier, applied to dynamically configure the number of lit-on LEDs in the LED subsections, which includes: a first adjustable LED lamp string unit, a first N-type switch module, at least one adjustable LED lamp string module, at least one P-type switch module, at least one second N-type switch module, a control logic module, applied to control the functions of the first adjustable LED lamp string unit, the adjustable LED lamp string module, the P-type switch module, the first N-type switch module and the second N-type switch module, as well as a current detection module, applied to detect the output currents from the first N-type switch module and the second N-type switch module before feeding back to the control logic module; wherein, the adjustable LED lamp string module comprises a second adjustable LED lamp string unit and a unidirectional conduction unit;

The control logic module outputs control signals, based on the output voltage changes from the bridge rectifier, to control the turn-on and turn-off states of the first adjustable LED lamp string unit, the adjustable LED lamp string module, the P-type switch module, the first N-type switch module and the second N-type switch module, also it adjusts the serial or parallel connection status of the first and the second adjustable LED lamp string units dynamically.

Figure 3:
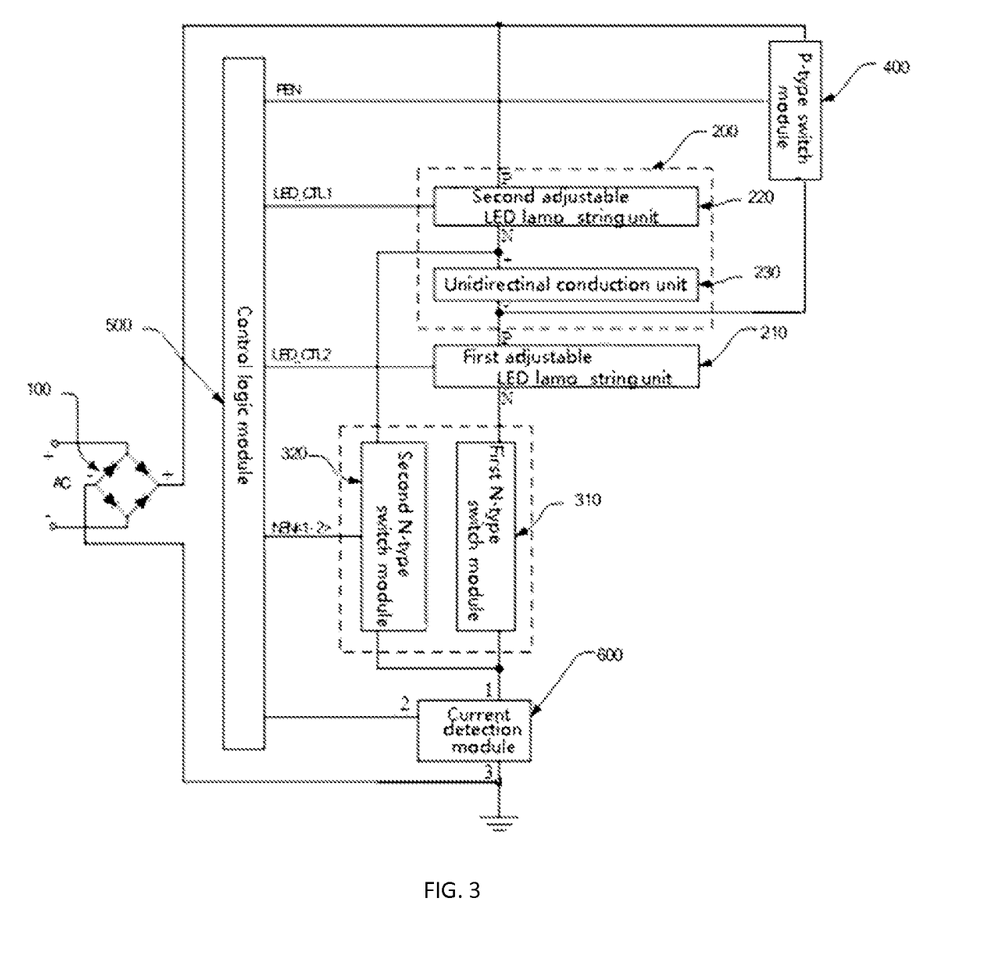
FIG. 3 illustrates a block diagram of the LED driving device for dynamic segment configurations as provided in the first preferred embodiment in the present invention.

Referencing to FIG. 3, which is a block diagram of the LED driving device for dynamic segment configurations as provided in the first preferred embodiment in the present invention. Shown as FIG. 3, in the LED driving device for dynamic segment configurations as provided in the present embodiment, the number of the first adjustable LED lamp string unit 210, the first N-type switch module 310, the adjustable LED lamp string module 200 (including the second adjustable LED lamp string unit 220 and the unidirectional conduction unit 230), the P-type switch module 400, the second N-type switch module 320, the control logic module 500 and the current detection module 600 is one only.

The control logic module 500 outputs PEN signals to control the on/off of the P-type switch module 400, and outputs NEN<1-2> signals to control the on/off of the first N-type switch module 310 and the second N-type switch module 320, thus controls the serial and parallel connection states of the first adjustable LED lamp string unit 210 and the second adjustable LED lamp string units 220 dynamically. The control logic module 500 outputs LED_CTL1, LED_CTL2 signals to configure the lit-on LED numbers in the adjustable LED lamp string module 200 and the first adjustable LED lamp string unit 210, the first end 1 of the current detection module 600 connects to the first N-type switch module 310 and the second N-type switch module 320, the second end 2 of the current detection module 600 connects to the control logic module 500, and the third end 3 of the current detection module 600 gets grounded, applied to detect the current passing through the first adjustable LED lamp string unit 210 and/or the adjustable LED lamp string module 200, and outputs the detection results to the control logic module 500, then, the control logic module 500 will back deduce the voltage output from the bridge rectifier, based on the detection results. The control logic module 500 may control itself output the according control signals, through control chips and according control software, dynamically configure the serial or parallel connection status of the first adjustable LED lamp string unit 210 and the second adjustable LED lamp string unit 220. The current detection module 600 only need to be able to detect the currents passing through the first N-type switch module 310 and the second N-type switch module 320, and feedback to the control logic module 500, thus the present invention has no restrictions on the circuit structure of the current detection module 600.

Figure 4:
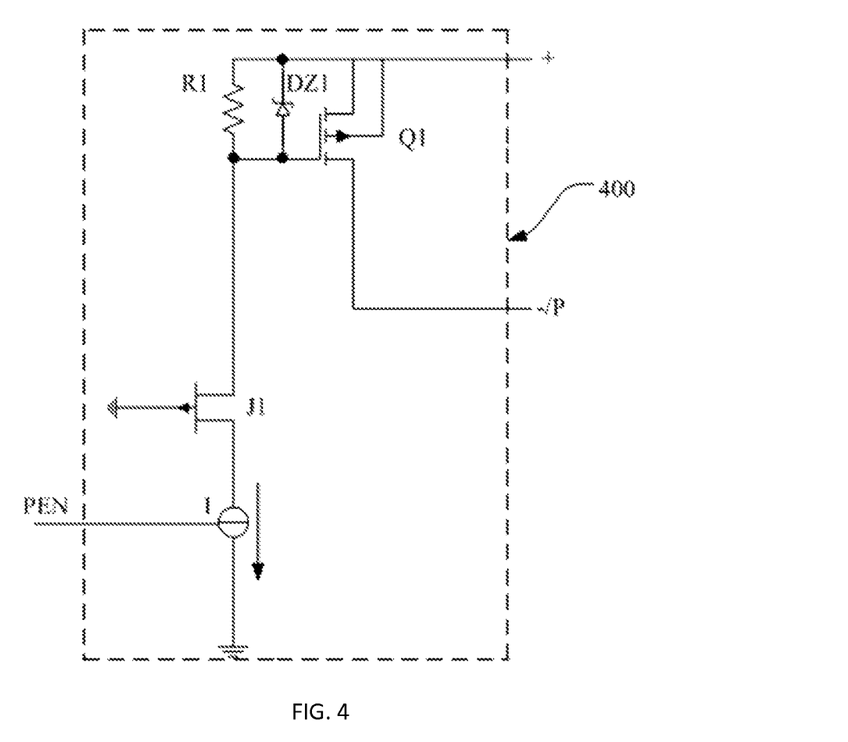
FIG. 4 illustrates a circuit diagram of the P-type switch module in the LED driving device for dynamic segment configurations as provided in the first preferred embodiment in the present invention.

Referencing to FIG. 4 together, the P-type switch module 400 includes a controllable current source I, JFET (The earliest field effect transistor (FET) owning a practical structure, which is also known as a PN junction type FET) J1, a first resistor R1, a Zener diode DZ1 and a first MOS transistor Q1. Wherein, the JFET J1 is a high voltage N-type JFET, the first MOS transistor Q1 is a high voltage PMOS transistor, wherein, the high voltage resistances of both the high voltage N-type JFET J1 and the high voltage PMOS transistor are over 311V (that is the peak voltage output from the bridge rectifier 100).

The controllable current source I connects to the control logic module 500, one end of the controllable current source I connects to the source of the JFET J1, and the other end of the controllable current source I gets grounded; the drain of the JFET J1 connects to the gate of the first MOS transistor Q1, and connects to the source of the first MOS transistor Q1 through the first resistor R1, the gate of the JFET J1 gets grounded. The control logic module 500 outputs PEN signals to control the status of the controllable current source I, and the controllable current source I provides an "on" current at $I_{th}$, and an "off" current at $0.1 \times I_{th}$. The high voltage N-type JFET J1 is always on, mainly applied to provide a cascade effect, to ensure the voltage on its source is always below the pinch-off voltage, and to avoid damaging the controllable current source I due to overvoltage.

The anode of the Zener diode DZ1 connects to the gate of the first MOS transistor Q1, and the cathode of the Zener diode DZ1 connects to the source of the first MOS transistor Q1; the drain of the first MOS transistor Q1 connects to the adjustable LED lamp string module 200 and the first adjustable LED lamp string unit 210 (which is marked as –/P in FIG. 4), the source of the first MOS transistor Q2 connects to the positive output end of the bridge rectifier 100 (marked as + in FIG. 4).

In the P-type switch module 400 as provided in the present embodiment, when the current passes through the first resistor R1, a voltage difference will be generated between both ends of the first resistor R1, thus, when the current output from the controllable current source I is 6, the voltage difference will be sufficient to turn on the high voltage PMOS transistor; and when the current output from the controllable current source I is $0.1 \times I_{th}$, the voltage difference will be not enough to turn on the high voltage PMOS transistor, thus the PMOS transistor will be off. The Zener diode DZ1 provides a clamping action, to avoid the damage of either gate or source of the PMOS transistor, due to overvoltage. The P-type switch module 400 as provided in the present embodiment achieves the function of controlling the on and off of a high voltage PMOs transistor through a low voltage control signal.

It should be noted that, in the P-type switch module 400 as provided in the present embodiment, the JFET J1 may be substituted by other electronic elements, including high voltage NMOS transistor, NPN triode, and more. In addition, the turn-off current output from the controllable current source I may be increased, or further decreased, to reduce the static power consumptions.

Referencing to FIG. 3 again, in the LED driving device for dynamic segment configurations as provided in the present invention, the adjustable LED lamp string module 200 includes a second adjustable LED lamp string unit 220 and a unidirectional conduction unit 230, the P terminal (i.e., positive) of the second adjustable LED lamp string unit 220 connects to the positive output terminal of the bridge rectifier 100, and connects to the negative terminal of the unidirectional conduction unit 230 and the P terminal of the first adjustable LED lamp string unit 210, through the P-type switch module 400, the N terminal (i.e., negative) of the second adjustable LED lamp string unit 220 connects to the positive terminal of the unidirectional conduction unit 230, and the N terminal of the second adjustable LED lamp string unit 220 connects to the current detection module 600, through the second N-type switch module 320, the N terminal of the first adjustable LED lamp string unit 210 connects to the current detection module 600, through the first N-type switch module 310.

In the present embodiment, the circuit structure of the second adjustable LED lamp string unit 220 is the same as that of the first adjustable LED lamp string unit 210, and both are able to adopt multiple circuit structures. Shown as FIG. 5, one circuit structure of the second adjustable LED lamp string unit 220 includes a first LED lamp string M1, a second LED lamp string M2 and a first P-type switch unit 410. The circuit structures of the first LED lamp string M1 and the second LED lamp string M2 are the same; each LED lamp string is composed by multiple LED lamps connected in series, and the first LED lamp string M1 is connected to the second LED lamp string M2 in series.

Figure 5:
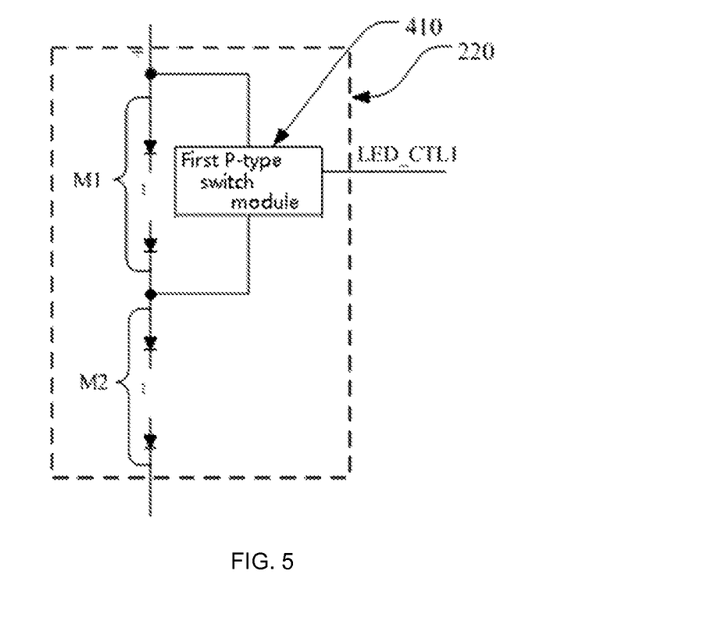
FIG. 5 illustrates a circuit diagram of an embodiment of the adjustable LED lamp string module in the LED driving device for dynamic segment configurations as provided in the first preferred embodiment in the present invention.

One end of the first P-type switch unit 410 connects to the positive terminal of the first LED lamp string M1, and the other end of the first P-type switch unit 410 connects to the negative terminal of the first LED lamp string M1 and the positive terminal of the second LED lamp string M2, the control terminal of the first P-type switch unit 410 connects to the control logic module 500, the positive terminal of the first LED lamp string M1 connects to the positive output terminal of the bridge rectifier 100, the negative terminal of the second LED lamp string M2 connects to the positive terminal of the unidirectional conduction unit 230.

When the first P-type switch unit 410 is turned on, the first LED lamp string M1 is turned off, when the first P-type switch unit 410 is turned off, the first LED lamp string M1 is turned on, thus, it is possible to control the number of lit-on lights in the LED lamp string through controlling the status of the first P-type switch unit 410.

In the present embodiment, the circuit structure of the first P-type switch unit 410 is the same as that of the P-type switch module 400, and the only difference is, the first P-type switch unit 410 adopts an isolated type of low voltage PMOS transistor instead of a high voltage PMOS transistor as used in the P-type switch module 400. The characteristics of an isolated type of low voltage PMOS transistor includes: 1. the voltage difference between the drain and the source of the low voltage PMOS transistor is no less than the sum of the positive voltages of the first LED lamp string M1, which is connected in parallel to the first P-type switch unit 410; 2. the withstand voltage from the drain, source and gate to the chip substrate is larger than the highest power source voltage.

Figure 6:
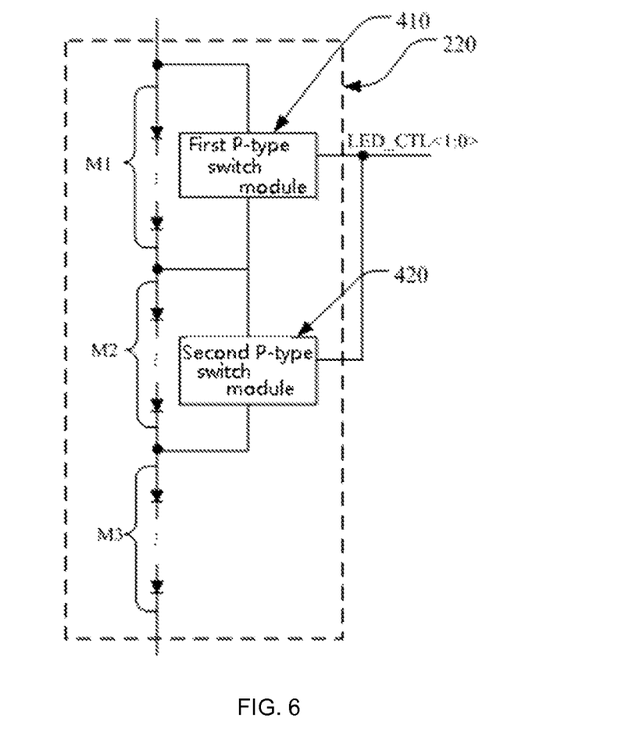
FIG. 6 illustrates a circuit diagram of another embodiment of the adjustable LED lamp string module in the LED driving device for dynamic segment configurations as provided in the first preferred embodiment in the present invention.

Referencing to FIG. 3 and FIG. 6, which is a circuit diagram of another embodiment on the adjustable LED lamp string unit in the LED driving device for dynamic segment configurations as provided in the first preferred embodiment in the present invention. The adjustable LED lamp string unit is the first adjustable LED lamp string unit 210 or the second adjustable LED lamp string unit 220. Shown as FIG. 6, the second adjustable LED lamp string unit 220 includes a first LED lamp string M1, a second LED lamp string M2, a third LED lamp string M3, a first P-type switch unit 410 and a second P-type switch unit 420. The first LED lamp string M1 and the second LED lamp string M2 and the third LED lamp string M3 are connected in series, one end of the first P-type switch unit connects to the positive terminal of the first LED lamp string, the other end of the first P-type switch unit connects to the negative terminal of the first LED lamp string and the positive terminal of the second LED lamp string, the control terminal of the first P-type switch unit connects to the control logic module; one end of the second P-type switch unit 420 connects to the positive terminal of the second LED lamp string M2, the other end of the second P-type switch unit 420 connects to the negative terminal of the second LED lamp string M2 and the positive terminal of the third LED lamp string M3, the control terminal of the second P-type switch unit 420 connects to the control logic module 500, the positive terminal of the first LED lamp string M1 connects to the positive output terminal of the bridge rectifier, the negative terminal of the third LED lamp string M3 connects to the positive terminal of the unidirectional conduction unit 230.

The only difference between the another embodiment and the embodiment on the adjustable LED lamp string unit, is, a group of P-type switch unit and a group of LED lamp string are added to the another embodiment, thus it is possible to adjust the number of lit-on LEDs in the LED lamp string, through the turn-on and turn-off states of the two P-type switch units, that is, adjusting the minimum positive voltage value of the LED lamp string to be $VF_{min}=VF \times M3$, the maximum to be $VF_{max}=VF \times (M1+M2+M3)$. Further, it is possible to adopt other numbers of the P-type switch units and the LED lamp strings in both the first adjustable LED lamp string unit 210 and the second adjustable LED lamp string unit 220.

Figure 7:
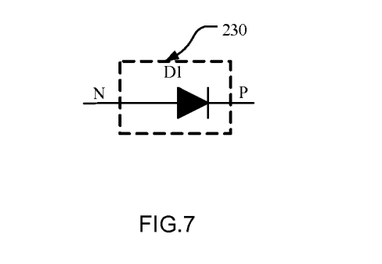
FIG. 7 illustrates a circuit diagram of the unidirectional conduction unit in the adjustable LED lamp string module in the LED driving device for dynamic segment configurations as provided in the first preferred embodiment in the present invention.

Referencing to both FIG. 3 and FIG. 7 together, in the LED driving device for dynamic segment configurations, the unidirectional conduction unit 230 includes a diode D1, the diode D1 is a high voltage diode (whose withstand voltage is over 311V), and its anode connects to the N terminal of the second adjustable LED lamp string unit 220, the cathode of the diode D1 connects to the P terminal of the first adjustable LED lamp string unit 210.

In the present embodiment, the unidirectional conduction unit 230 works only in two states: on and off, during the on state, the voltage difference between the two ends is expected to be as small as possible, in the off state, the voltage at the negative terminal is expected to be larger than the voltage at the positive terminal without any leakages. Of course, the present invention is possible to adopt other unidirectional conduction devices having the same functions, such as using MOS transistors or transistors connecting with diodes instead of the diode. The present invention has no restrictions on the electric elements adopted in the unidirectional conduction unit.

Figure 8:
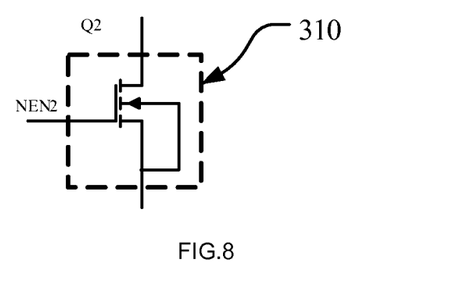
FIG. 8 illustrates a circuit diagram of the first N-type switch module in the adjustable LED lamp string module in the LED driving device for dynamic segment configurations as provided in the first preferred embodiment in the present invention.

Referencing to both FIG. 3 and FIG. 8 together, the first N-type switch module 310 includes a second MOS transistor, the gate of the second MOS transistor Q2 connects to the control logic module 500, the drain of the second MOS transistor Q2 connects to the N terminal of the first adjustable LED lamp string unit 210, the source of the second MOS transistor Q2 gets grounded through the current detection module 600.

Figure 9:
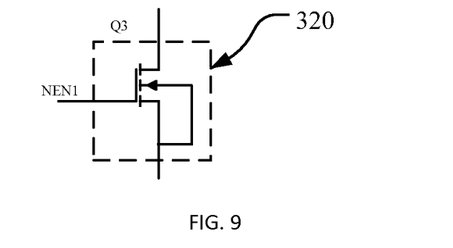
FIG. 9 illustrates a circuit diagram of the second N-type switch module in the adjustable LED lamp string module in the LED driving device for dynamic segment configurations as provided in the first preferred embodiment in the present invention.

Accordingly, referencing to both FIG. 3 and FIG. 9 together, the second N-type switch module 320 includes a third MOS transistor Q3, the gate of the third MOS transistor connects to the control logic module 500, the drain of the third MOS transistor Q3 connects to the N terminal of the second adjustable LED lamp string unit 220, the source of the third MOS transistor Q3 get grounded through the current detection module 600.

In the present embodiment, the circuit structures of the first N-type switch module 310 and the second N-type switch module 320 are the same. Both the second MOS transistor Q2 and the third MOS transistor Q3 are high voltage NMOS transistors, the withstand voltage of the second MOS transistor Q2 is higher than that of the third MOS transistor Q3.

Figure 10:
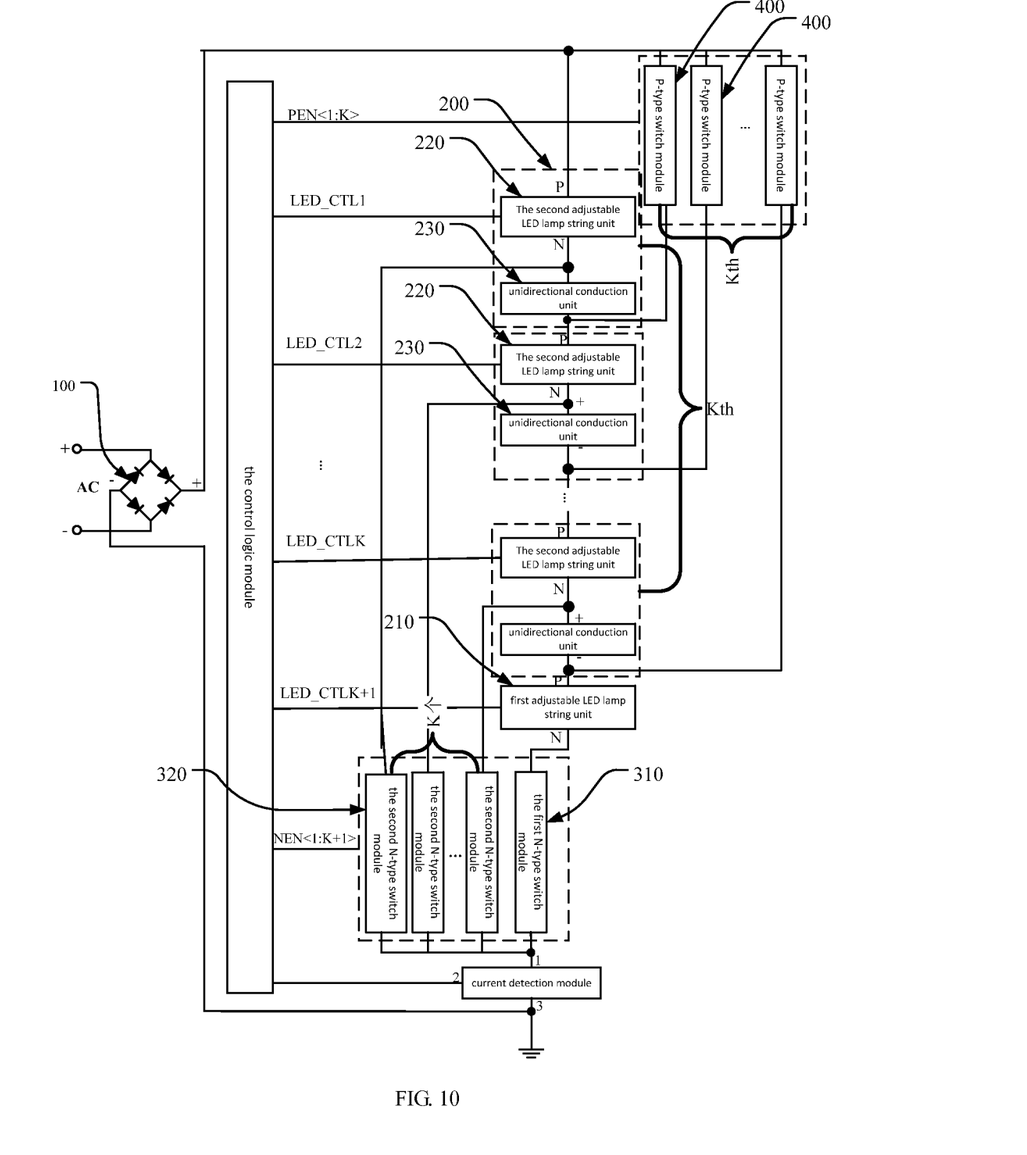
FIG. 10 illustrates a block diagram of the LED driving device for dynamic segment configurations as provided in the second preferred embodiment in the present invention.

The LED driving device for dynamic segment configurations as provided in the second preferred embodiment in the present invention is shown in FIG. 10, in the presented second preferred embodiment, the number of the adjustable LED lamp string modules 200, P-type switch modules 400 and the second N-type switch modules 320 is K, wherein, K is a positive integer. In the first preferred embodiment, K is a number equal to 1, while in the second preferred embodiment, the K is a positive integer no less than 2. Shown as FIG. 10, every adjustable LED lamp string module 200 connects to a P-type switch module 400 and a second N-type switch module 320, the first adjustable LED lamp string unit 210 connects to the current detection module 600 through the first N-type switch module 310. In the embodiment shown in FIG. 10, from left to right, the P-type switch module 400 and the second N-type switch module 320 is the first, the second, . . . the K'th in sequence, (shown as the bold numbers 1, 2 . . . K in FIG. 10), from upper to lower, the second adjustable LED lamp string unit 220 is the first, the second, . . . the K'th in sequence, (shown as the bold numbers 1, 2 . . . K in FIG. 10).

Since the first adjustable LED lamp string unit 210 is the same as the second adjustable LED lamp string unit 220, the second N-type switch module 320 is the same as the first N-type switch module 310, for the purpose of convenient descriptions, both the first adjustable LED lamp string unit 210 and the second adjustable LED lamp string unit 220 are called adjustable LED lamp string unit, both the second N-type switch module 320 and the first N-type switch module 310 are called N-type switch module in the present invention. Therefore, the numbers of both the adjustable LED lamp string units and the N-type switch modules are K+1, and the N-type switch module is composed by high voltage NMOS transistors, whose withstand voltage decreases in a sequence from the first to the (K+1)th.

The control logic module outputs control signals and controls the turn-on and turn-off states of the first adjustable LED lamp string unit, K of the adjustable LED lamp string modules, K of the P-type switch modules, the first N-type switch module and K of the second N-type switch modules, adjusts dynamically the serial and parallel connection states of the first adjustable LED lamp string unit and K of the second adjustable LED lamp string units, achieves a group of adjustable LED lamp string in a number of N, then connecting each group in parallel; wherein, N is a positive integer from 1 to K+1. As shown in FIG. 10, the LED driving device for dynamic segment configurations provided in the second preferred embodiment, detects the current in each N-type switch module through the current detection module 600, and feeds it back to the control logic module 500, then the control logic module 500 deduces the voltage output from the bridge rectifier 100, based on the current value, so as to output signals PEN<1:K>, LED_CTL1-LED_CTLK+1 and NEN<1:K+1>, to control the parallel and serial connection states of each adjustable LED lamp string, and the numbers of lit-on LEDs in each adjustable LED lamp string, so as to dynamically configure the number of lit-on LEDs.

Detailed descriptions to the method of dynamical configuration as in the present invention are listed below, based on the second preferred embodiment:

When the voltage output from the bridge rectifier 100 is between $VF_{min}$ and $VF_{max}$, connecting all adjustable LED lamp string units in parallel, now all the LED lamp string are lit-on. The implementation method is: turn on all the P-type switch modules 400 (in a number of K, totally) and all the N-type switch modules (in a number of K+1, totally), then all the positive terminals of the unidirectional conduction units 230 (in a number of K, totally) connect to the current detection module 600 through the according N-type switch modules before getting grounded, all the negative terminals of the unidirectional conduction units 230 connect to the output terminal of the 100 through the according P-type switch module 400, all the unidirectional conduction units 230 are in the reverse blocking status, each of the adjustable LED lamp string unit is isolated by the reverse blocking unidirectional conduction unit 230. The P terminals from the second adjustable LED lamp string unit to the K+1th adjustable LED lamp string unit are connected to the positive output terminal of the bridge rectifier 100, through according P-type switch modules 400; all the N terminals of the adjustable LED lamp string units are connecting to the first terminal 1 of the current detection module 600, through the according N-type switch modules, therefore, all the adjustable LED lamp string units have currents passing through, and all the adjustable LED lamp string units have lights output.

When the voltage output from the bridge rectifier 100 is between $VF_{max}$ and $2VF_{max}$, connecting every two of the adjustable LED lamp string units in series before connecting in parallel, if the number of the adjustable LED lamp string units is not divisible by 2, then the extra one adjustable LED lamp string unit is controlled to be off. The implementation method is: the control logic module 500 controls the first P-type switch module 400 be off, the second P-type switch module 400 be on, the first N-type switch module be off, the second N-type switch module be on, then, the first adjustable LED lamp string unit, the first unidirectional conduction unit 230 and the second adjustable LED lamp string unit connect to a point between the output terminal of the bridge rectifier 100 and the current detection module 600, which makes the first and the second adjustable LED lamp string units be lit-on; similarly, controls the third P-type switch module 400 be off, the fourth P-type switch module 400 be on, the third N-type switch module be off, the fourth N-type switch module be on, then, the third adjustable LED lamp string unit, the third unidirectional conduction unit 230 and the fourth adjustable LED lamp string unit connect to a point between the output terminal of the bridge rectifier 100 and the current detection module 600, which makes the third and the fourth adjustable LED lamp string units be lit-on; so as on, controls the 2N-1th P-type switch module 400 and the 2N-1th N-type switch module be off, the 2Nth P-type switch module 400 and the 2Nth N-type switch module be on, then, makes the 2N-1th adjustable LED lamp string unit, the 2N-1th unidirectional conduction unit 230 and the 2N adjustable LED lamp string unit connect to a point between the output terminal of the bridge rectifier 100 and the current detection module 600, and making it lit-on, so as to achieve the adjustable LED lamp string units connect every two in series into a group, before connecting groups in parallel.

When the voltage output from the bridge rectifier 100 is between $2VF_{max}$ and $3VF_{max}$, connecting every three of the adjustable LED lamp string units in series before connecting in parallel. If the number of the adjustable LED lamp string units is not divisible by 3, then the extra adjustable LED lamp string units are controlled to be off. The implementation method is: the control logic module 500 controls the first and the second P-type switch module 400 be off, the third P-type switch module 400 be on, the first and the second N-type switch module be off, the third N-type switch module be on, then, the first to the third adjustable LED lamp string units, the first and the second unidirectional conduction unit 230 connect to a point between the output terminal of the bridge rectifier 100 and the current detection module 600, which makes the first to the third adjustable LED lamp string units be lit-on; similarly, controls the fourth and the fifth P-type switch modules 400 be off, the sixth P-type switch module 400 be on, controls the fourth and the fifth N-type switch module be off, the sixth N-type switch module be on, then, the fourth to the sixth adjustable LED lamp string unit, the fourth and the fifth unidirectional conduction unit 230 connect to a point between the output terminal of the bridge rectifier 100 and the current detection module 600, which makes the fourth to the sixth adjustable LED lamp string units be lit-on; so as on, controls the 3N-2th, 3N-1th P-type switch module 400 be off, and the 3N-2th, 3N-1th N-type switch module be off, and controls the 3Nth P-type switch module 400 and the 3Nth N-type switch module be on, which makes the 3N-2th, the 3N-1th, the 3Nth adjustable LED lamp string unit, the 3N-2th, 3N-1th unidirectional conduction unit 230 connect to a point between the output terminal of the bridge rectifier 100 and the current detection module 600, and making the 3N-2th, 3N-1th, 3Nth adjustable LED lamp string unit lit-on.

And so on, therefore, it is possible to achieve the number of P connections in series and Q connections in parallel, wherein, P is an integer between 1 and K+1, Q is an integer between 1 and (K+1)/P.

The embodiments of the present invention also provide an according LED lighting apparatus, which includes: a bridge rectifier applied to rectify the input signals and an LED driving device for dynamic segment configurations, wherein, the positive output terminal of the bridge rectifier connects to the LED driving device for dynamic segment configurations, while the negative output terminal of the bridge rectifier gets grounded. The supplied AC power connects into the bridge rectifier, then gets rectified by the bridge rectifier, before being input into the LED driving device for dynamic segment configurations, then, the LED driving device for dynamic segment configurations starts to configure the parallel and serial connection states of each adjustable LED lamp string unit dynamically, based on the output voltage of the bridge rectifier. Since both the circuit structure and the operation principle of the LED driving device for dynamic segment configurations have been described in details above, no more descriptions will be listed here.

Comparing to prior arts, the present invention owns the following benefits:

1. A light flux of an LED driven by a conventional AC driving apparatus will get higher following the rising of supplied power voltages. However, after adopting the LED driving device for dynamic segment configurations as provided in the present invention, when the voltage is low, connects all lights strings in parallel first, then following the voltage variations, divides all lamps into groups, lamps in each group are connected in series, and different groups are connected in parallel, so as to light on LED lamps as many as possible, and ensures more light flux get output. This ensures that, during the whole period of supplied power varying, most LED lamps are lit-on, thus the light flux will not change too much.

2. For a conventional AC driving apparatus for LED, when the voltage is low, only part of the lamps are lit-on, and when the voltage is high, all lamps are lit-on, thus, in a sinusoidal voltage cycle, some of the LED beams are always lit-on, while other part of the LED beams are lit-on only in ¼ cycle or even less, thus the attenuations of all LED light beams are different, resulting in a worse lighting effects after a long time. However, after adopting the LED driving device for dynamic segment configurations as provided in the present invention, the lit-on time is almost the same, which therefore, ensures the lighting effects over a long period keep the same.

3. After adopting the LED driving device for dynamic segment configurations as provided in the present invention, almost all LED lamps are lit-on all the time, which improves the utilization of LED lamps.

It should be understood that, the application of the present invention is not limited to the examples listed. It will be possible for a person skilled in the art to make modification or replacements according to the descriptions, which shall all fall within the scope of protection in the appended claims of the present invention.

What is claimed is:

1. An LED driving device for dynamic segment configurations, connecting to a bridge rectifier, wherein, the LED driving device comprises:

a first adjustable LED lamp string unit, a first N-type switch module, at least one adjustable LED lamp string module, at least one P-type switch module, at least one second N-type switch module, a control logic module, applied to control the first adjustable LED lamp string unit, the adjustable LED lamp string module, the P-type switch module, the first N-type switch module and the second N-type switch module, as well as a current detection module, applied to detect the output currents from the first N-type switch module and the second N-type switch module before feeding back to the control logic module; the adjustable LED lamp string module comprises a second adjustable LED lamp string unit and a unidirectional conduction unit; and a control logic module outputs control signals, based on the output voltage variations from the bridge rectifier, to control the turn-on and turn-off states of the first adjustable LED lamp string unit, the adjustable LED lamp string module, the P-type switch module, the first N-type switch module and the second N-type switch module, also it adjusts the serial and parallel connection states of the first and the second adjustable LED lamp string units dynamically.

2. The LED driving device for dynamic segment configurations according to claim 1, wherein, the P terminal of the second adjustable LED lamp string unit connects to the positive output terminal of the bridge rectifier, as well as connecting to the negative terminal of the unidirectional conduction unit and the P terminal of the first adjustable LED lamp string unit through the P-type switch module, positive terminal of the unidirectional conduction unit, the N terminal of the second adjustable LED lamp string unit connects to the current detection module through the second N-type switch module, the N terminal of the first adjustable LED lamp string unit connects to the current detection module through the first N-type switch module.

3. The LED driving device for dynamic segment configurations according to claim 2, wherein, the second adjustable LED lamp string unit includes a first LED lamp string, a second LED lamp string and a first P-type switch unit; the first LED lamp string connects to the second LED lamp string in series, one end of the first P-type switch unit connects to the positive terminal of the first LED lamp string, the other end of the first P-type switch unit connects to the negative terminal of the first LED lamp string and the positive terminal of the second LED lamp string, the control terminal of the first P-type switch unit connects to the control logic module, the positive terminal of the first LED lamp string connects to the positive output terminal of the bridge rectifier, the negative terminal of the second LED lamp string connects to the positive terminal of the unidirectional conduction unit.

4. The LED driving device for dynamic segment configurations according to claim 2, wherein, the second adjustable LED lamp string unit includes a first LED lamp string, a second LED lamp string, a third LED lamp string, a first P-type switch unit and a second P-type switch unit; the first LED lamp string, the second LED lamp string and the third LED lamp string are connected in series, one end of the first P-type switch unit connects to the positive terminal of the first LED lamp string, the other end of the first P-type switch unit connects to the negative terminal of the first LED lamp string and the positive terminal of the second LED lamp string, the control terminal of the first P-type switch unit connects to the control logic module; one end of the second P-type switch unit connects to the positive terminal of the second LED lamp string, the other end of the second P-type switch unit connects to the negative terminal of the second LED lamp string and the positive terminal of the third LED lamp string, the control terminal of the second P-type switch unit connects to the control logic module, the positive terminal of the first LED lamp string connects to the positive output terminal of the bridge rectifier, the negative terminal of the third LED lamp string connects to the positive terminal of the unidirectional conduction unit.

5. The LED driving device for dynamic segment configurations according to claim 3, wherein, the unidirectional conduction unit includes a diode, whose anode connects to the N terminal of the second adjustable LED lamp string unit, while the cathode of the diode connects to the P terminal of the first adjustable LED lamp string unit.

6. The LED driving device for dynamic segment configurations according to claim 2, wherein, the first N-type switch module includes a second MOS transistor, the gate of the second MOS transistor connects to the control logic module, the drain of the second MOS transistor connects to the N terminal of the first adjustable LED lamp string unit, and the source of the second MOS transistor gets grounded through the current detection module; and A second N-type switch module includes a third MOS transistor, the gate of the third MOS transistor connects to the control logic module, the drain of the third MOS transistor connects to the N terminal of the second adjustable LED lamp string unit, and the source of the third MOS transistor gets grounded through a current detection module.

7. The LED driving device for dynamic segment configurations according to claim 1, wherein, the P-type switch module includes a controllable current source, JFET, a first resistor, a Zener diode and a first MOS transistor; the controllable current source connects to the control logic module, one end of the controllable current source connects to the source of the JFET, while the other end gets grounded; the drain of the JFET connects to the gate of the first MOS transistor, and the source of the first MOS transistor through a first resistor, the gate of the JFET gets grounded; the anode of the Zener diode connects to the gate of the first MOS transistor, the cathode of the Zener diode connects to the source of the first MOS transistor; the drain of the first MOS transistor connects to the adjustable LED lamp string module and the first adjustable LED lamp string unit, the source of the first MOS transistor connects to the positive output terminal of the bridge rectifier.

8. The LED driving device for dynamic segment configurations according to claim 1, wherein, the number of each of the adjustable LED lamp string module, P-type switch module and the second N-type switch module is K, wherein, K is a positive integer; and The control logic module outputs control signals based on the variations of the output voltages from the bridge rectifier, and controls the turn-on and turn-off states of the first adjustable LED lamp string unit, K of the adjustable LED lamp string modules, K of the P-type switch modules, a first N-type switch module and K of the second N-type switch modules, adjusts the parallel and serial connection states dynamically, of the first adjustable LED lamp string unit and K of the second adjustable LED lamp string units, achieves one group of adjustable LED lamp string units in a number of N connecting in series, before connecting different groups in parallel; wherein, N is a positive integer from 1 to K+1.

* * * * *